United States Patent [19]

Bliss et al.

[11] 3,798,610

[45] Mar. 19, 1974

[54] MULTIPLEXED INTELLIGENCE COMMUNICATIONS

[75] Inventors: Burtt E. Bliss, Hyde Park; James T. Dervan, III, Salt Point, both of N.Y.; Leroy E. Griffith, Boulder, Colo.; Bruce D. Pung, Wappingers Falls, N.Y.; Robert A. Thorpe; Norman A. Vogel, both of Poughkeepsie, N.Y.

[73] Assignee: International Business Machines Corporation, Armonk, N.Y.

[22] Filed: Dec. 20, 1972

[21] Appl. No.: 316,787

[52] U.S. Cl.340/172.5, 178/DIG. 22, 178/DIG. 23, 340/324 AD

[51] Int. Cl. ......... G06f 3/04, G06f 3/14, H04l 5/00

[58] Field of Search ...... 340/172.5, 324 A, 324 AD; 179/2 TV, 15 AL, 15 BE; 178/6.8, 58, DIG. 23, 69.5, 5.6, DIG. 22

[56] References Cited

UNITED STATES PATENTS

| | | | |
|---|---|---|---|
| 3,380,028 | 4/1968 | Gustafson et al. | 340/172.5 |
| 3,346,853 | 10/1967 | Koster et al. | 340/172.5 |
| 3,500,335 | 3/1970 | Cuccio | 340/172.5 |
| 3,501,746 | 3/1970 | Vosbury | 340/172.5 |
| 3,643,252 | 2/1972 | Roberts | 340/324 A |
| 3,648,245 | 3/1972 | Dodds et al. | 340/172.5 |
| 3,648,271 | 3/1972 | McConnell | 340/324 A |
| 3,653,001 | 3/1972 | Ninke | 340/172.5 |
| 3,654,620 | 4/1972 | Bartocci | 340/172.5 |
| 3,747,087 | 7/1973 | Harrison | 340/324 AD |
| 3,753,240 | 8/1973 | Merwin | 340/172.5 |

*Primary Examiner*—Paul J. Henon
*Assistant Examiner*—James D. Thomas
*Attorney, Agent, or Firm*—Robert Lieber

[57] ABSTRACT

Time multiplexed signal communications between a host computer and subordinate data processing terminals include coded and non-coded information. Coded information originated by the host includes entry-separation marker signals. Individual marker signals are used at terminals to control access to associated particular time spaces of the multiplex frame. The host signals are serially stored by addressed terminals in the time sequence of transmission. The stored marker signals are protected from modification at terminals and control write-in access to storage spaced allocated to the associated time segments; thereby controlling terminal editing operations. Edited information in unprotected terminal storage spaces is easily segregated -- e.g., for compact transmission to the host -- by reference to the stored marker signals. When the non-coded signals comprise raster scanned picture information displayable at terminal display apparatus the markers are used to generate cursors indicating edit-accessible positions (e.g., character entry spaces). A distinct displaced cursor provides unique indication of the space next accessible for entry in a normal keying (i.e., typing) sequence.

17 Claims, 15 Drawing Figures

MULTIPLEXED INTELLIGENCE COMMUNICATIONS

BACKGROUND OF THE INVENTION

1. Definitions

The terms "facsimile" and "raster-scanned video" are used herein in a generic and synonymous context to denote non-visible signals which represent discrete points of an image and which are useful to reconstruct the image. These terms are intended to comprehend both non-interlaced and interlaced raster scan patterns as well as other image tracing or scanning patterns.

2. Description of the Prior Art

Networks of computers and terminals linked for time-shared communication are used for interactive or conversational data handling processes examples of which would be bank and credit card posting and billing transactions, computer assisted instruction, etc. Typically, a central or host data processor, having large capacity files of pictoral (non-coded) information (e.g., microphotographs) and electronically stored coded data, transmits signals representing selected pictures scanned in a flying spot raster interlaced in time with signals representing selected data. Addressed terminals receive and store such in respective cyclic buffers coordinated with respective raster scanned display and hard copy printing apparatus. The stored information is used at the terminals to reproduce the pictoral information on the display and, selectively, in hard copy the image may be a customer ledger, student questionnaire, map, graph, etc. The terminal operator (e.g., bank teller, student, field officer, etc.) responsively manipulates appropriate input means (e.g., keyboard, light pen, coordinate control lever, stylus, document scan equipment, etc.) to enter data and video signal representations into specific storage spaces of the terminal buffer. The resulting composite recording may include host originated picture and data signal elements and terminal originated picture and data signal elements. Representations of such composite recordings are electrically transmitted from the terminal to the host for additional processing or back-up storage.

In situations where communication bandwidth and/or time must be conserved it is desirable to compact the return communications from the terminals to the host. We have devised an efficient system for enabling the host to arbitrarily partition the terminal buffer into accessible and inaccessible spaces enabling the terminals to quickly perform editing operations relative to the information recorded in respective buffers and to quickly extract and transmit edited information relative to the host. The edited information is subject to unambiguous reception and intelligible handling by the host in relation to retained copies of original host transmissions.

SUMMARY OF THE INVENTION

The subject invention provides a system organization for achieving more efficient processing and signal communication in a communication network organized to handle picture, voice and data representations having distinctly different bandwidth characteristics. Present terminals may contain picture display apparatus, input means (e.g., keyboards) and display-synchronous cyclic buffer storage units (e.g., compliant disc video storage). Terminals receive and store intelligence transmitted by a host computer over a party line transmission link. The transmitted intelligence comprises frames of raster-scanned video signals with interlaced lines of data and control representations. Stored control lines can be read but not modified by terminals. Control data and video lines and distinguished by tag code representations in the line "dead space" (retrace time). One distinct type of control line contains variably spaced access marker signals (also called entry-separation markers) each of which controls terminal write-in access to an individually associated character space segment of the stored video frame. Each such space segment comprises the space needed to represent the code of an alphanumeric (A/N) character or blank and the non-coded line trace (raster) of the corresponding symbol. The access marker signals also control extraction of written-in information from respective marked space segments for processing and transmission editing functions. The access marker signals also control generation of access indicative cursors.

In a typical application the host may transmit address code information and non-coded facsimile of a questionnaire image with interlaced access marker and character code lines. Addressed terminals store the video and marker information and utilize the store intelligence to display associated video and access cursor representations. Coded signals representing successive responses or answers of the terminal operator are assimilated into stored character code lines at successive accessible character space sections marked as accessible by successive marker signals in associated marker lines. Assimilated code is translated into video by terminal video translation apparatus and the video is stored in appropriate marked spaces of corresponding video lines. Assimilated code is subject to segregation and compact transmission to the host.

According to a more specific aspect of the invention, signals which comprise a host transmission frame include terminal address information, frame type information (video/ non-video) frame and line synch pulses, line tag codes and interlaced lines of video representations (for video type frames only), data (or audio) representations and control representations. Foregoing lines are distinguished by respective tag code pulses adjacent or mixed with respective line synchronizing pulses. One type of control line contains selectively positioned entry-separation marker signals, individually associated with corresponding space segments of a predetermined set of associated lines. This effectively maps the associated lines into accessible and inaccessible space segments and is useful to facilitate terminal processing and transmission editing functions.

It is contemplated that terminal addresses may be transmitted from the host either with discrete frames or with single lines. This would permit the host to modify either entire frames or single lines of buffered terminal intelligence.

It is contemplated that terminal addresses may be transmitted from the host either with discrete frames or with single lines. This would permit the host to modify either entire frames or single lines of buffered terminal intelligence.

It should be evident that composite intelligence of highly varied form can be assembled in terminal buffers by composition of host originated and terminal originated signals under control of host originated protected access markers as characterized above.

A feature of the invention is the provision of terminal apparatus comprising a serial-parallel line shifter apparatus operative in association with video type frames outputs of the cyclic terminal buffer of the terminal to receive and recirculate individual lines of character code and access marker representations in parallel for convenient assimilation and separation of terminal originated (keyed or typed) information. This line shifter operates to:

A. Translate individual character code lines as read out of the terminal buffer from serial form to character serial-bit parallel form suitable for efficient assimilation and video conversion of terminal (keyed) character code inputs in accessible spaces marked by the access markers. The video conversion is accomplished by a video generation unit of the generation unit of the terminal which translates bit parallel code bytes to corresponding video signals synchronous with corresponding video line segments of the buffer frame.

B. Translate signals reversely from byte serial-bit parallel form to byte serial-bit serial form for rewriting assimilated input codes into the terminal buffer;

C. Translate buffer lines as in (A) above to enable the terminal to separate assimilated terminal originated code from host-originated code efficiently; e.g., for local processing and/or compact transmission to the host.

According to another feature of the invention, individual frames and/or lines of an individual terminal buffer may be modified by the host computer.

According to another feature of the invention, host transmissions may be framed at a sub-multiple of the terminal display scan frequency and stored in plural sections of the cyclic terminal buffer providing interlaced displays of higher quality spot resolution (e.g., for photocomposition usage).

The foregoing and other features and advantages of the invention will be appreciated from the following description thereof.

DETAILED DESCRIPTION OF PREFERRED EMBODIMENT

System Organization

Figure 1:
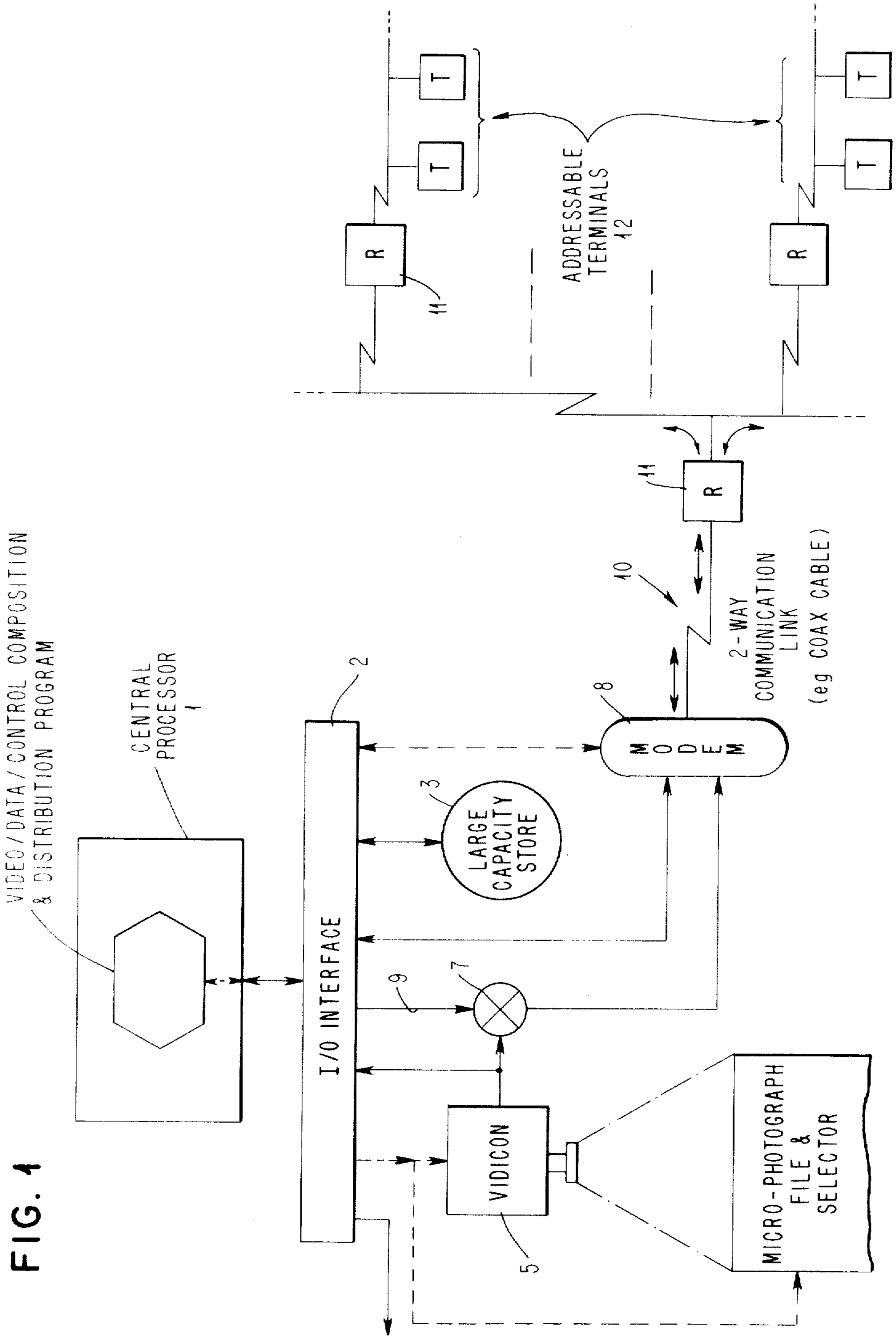
FIG. 1 is a schematic illustration of the subject communication system specifically indicating the organization of the host central processor and the network link to the terminals.

FIG. 1 illustrates the environmental system of the subject invention. Central (host) processor unit 1 connects via I/O interface 2 with large capacity data store 3 and source 5 of video signal representations (e.g., vidicon camera). Source 5 associates e.g., with picture file unit 6 arranged to permit automatic selection and positioning of microphotographs, documents, pictures or the like, in "juke-box" fashion, thereby providing corresponding raster video representations at the signal outlet of camera 5. The video signals are transferrable either to the host processor, for processing, or to mixer circuit 7 feeding the transmitting (modulating) input of transceive modem 8. The other input 9 to mixer 7 couples I/O interface 2 to the modem and enables the host computer to transmit either composite video, comprising e.g., camera-originated and computer-originated video representations, or other forms of information (e.g., voice signals). The host transmissions include address, tag code, control and coded data signals arranged between video lines as explained hereafter.

Modem 8 communicates bi-directionally via transmission link 10 (e.g., coax cable) and two-way repeaters such as 11 with multiple transceiver terminals 12 organized for video processing and display, and having distinct addresses.

Terminal Organization

Figures 2, 3:
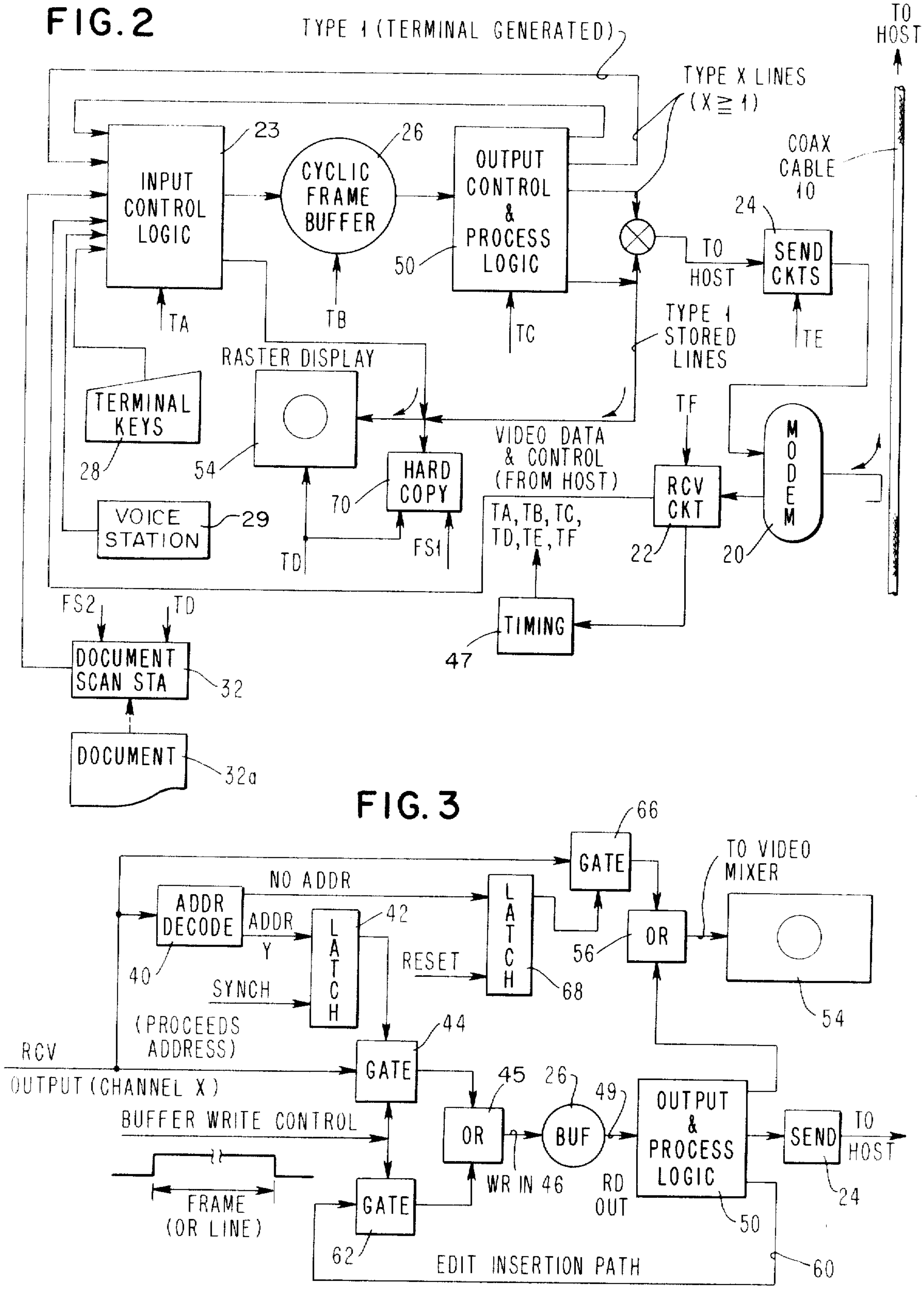
FIG. 2 is a schematic of a typical terminal in said system.
FIG. 3 is a schematic of terminal logic organization for loading and editing the cyclic buffer and operating the flying spot display.

As shown in FIG. 2, a typical terminal 12 includes a modem 20 interfacing with cable 10 and receive and transmit circuits 22,24. Host processor transmissions are received from cable 10 via modem 20. Receive circuits 22 and input switching logic 24 distinguish address information and transfer accompanying intelligence to cyclic buffer stores 26 of addressed terminals. Terminal logic described below operates to distinguish lines of control signal information interlaced between lines of displayable video or other information (e.g., audio) in the outputs of input switching circuits 24 and buffer 26. In response to access marker lines this terminal logic enables editing functions to be performed relative to prescribed spaces of the buffer 26 indicated by individual marker signals and also produces display cursors indicative of the access partitioning of the buffer space.

Since accessible buffer spaces are predetermined by the host originated marker lines, the access partitioning is a host function and terminal transmissions are subject to interpretation and reconstruction relative to the original field when received at the host.

Terminal originated coded and non-coded information may be produced by any of a plurality of well known input devices exemplified by keyboard 28, voice station 29 (telephone plus delta modulation switching) and/or document scanning apparatus represented at 32; the latter providing optoelectronic scanning of documents 32*a*.

As indicated in FIG. 3, host transmissions received via modem 20 and receive circuits 22, in the appropriate frequency channel or other communication channel (channel X) are applied to address decoder circuit 40. If the header information in the dead time (retrace interval) of the transmission frame identifies the specific address of that terminal (e.g., "address Y") latch 42 is set partially conditioning gate circuit. Depending upon the type of information in the incoming frame, identified by other header information the information of the frame will either be directly processed or stored in buffer 26. Video tpye frames are written into buffer 26, via gate 44, OR circuit 45 and write-in path 46 (WR IN) under control of signals supplied by timing unit 47 (FIG. 2). A mixer circuit may be used instead of OR 45 if received signals include analog components.

During subsequent cycles, stored signals are presented cyclically at read output (RD OUT) 49 of buffer 26 for processing by output processing logic circuits 50, the latter circuits interface with display unit 54 via OR circuit 56 and also with the host computers via send circuits 24. Output logic 50 also controls the synchronous entry of terminal originated intelligence into the protectively marked edit insertion path (60, 62, 45, 46) of the buffer 26.

Display unit 54 may also receive direct (unbuffered) inputs from receive circuits 22 via gate 66 when address decoder 40 detects a "No Address" condition in the incoming header and sets latch 68. In this way, the display may be operated as a continuous television display for ordinary television programming.

Additional terminal processing elements, as suggested in FIG. 2, would include a printer (hard copy) apparatus 70. This unit would be capable of "snatching" discrete frames of buffered display video identified by frame selection function FSI and producing corresponding hard copy.

Line Signals Formats

Figure 4:
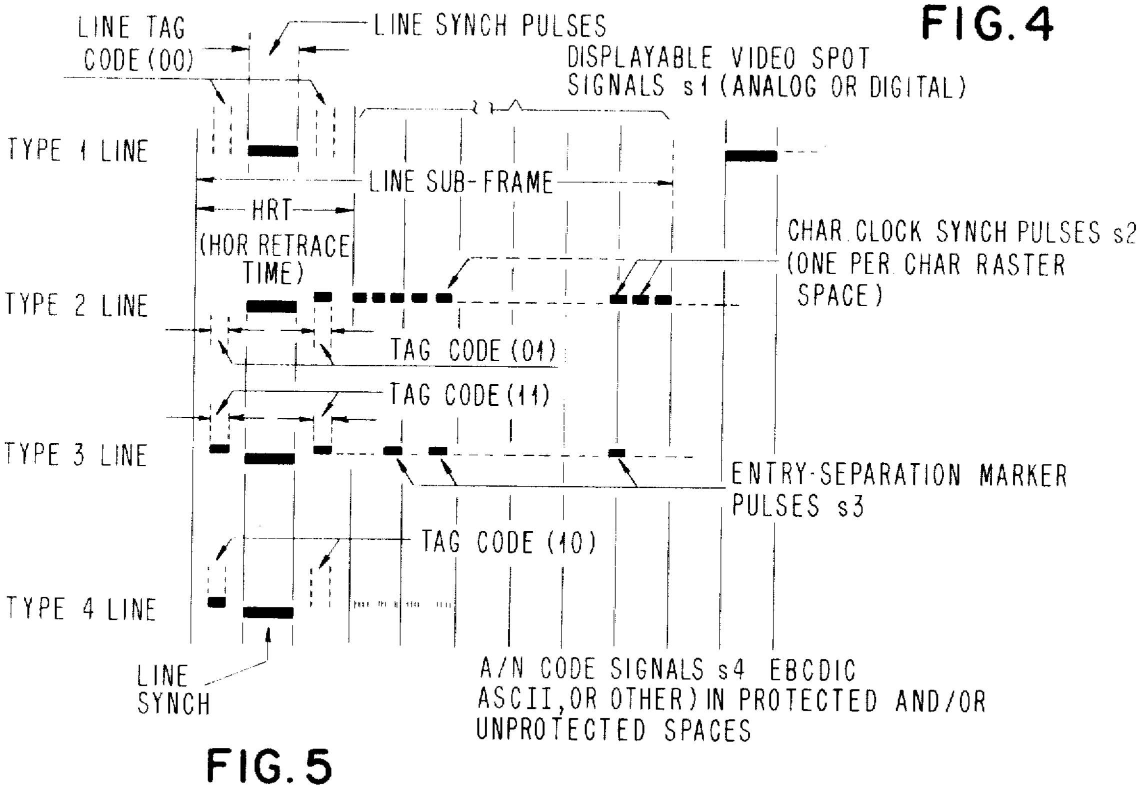
FIG. 4 is a waveform diagram of video, clock, access marker and code signal lines in accordance with the invention.
Figure 5:
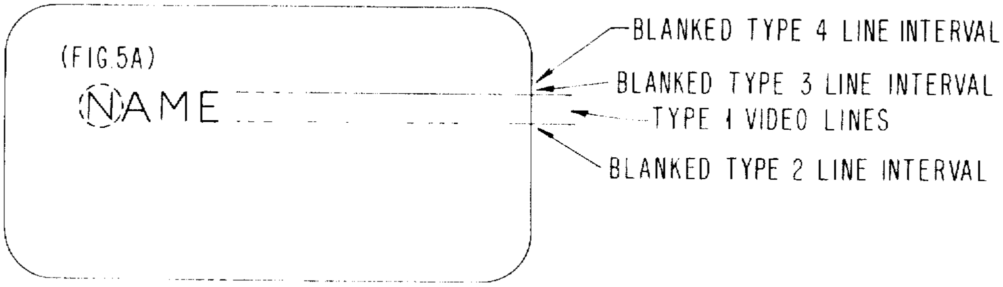
FIGS. 5 and 5A illustrate the raster trace of a line of character test indicating a sequence of occurrence of control and video signal lines in accordance with the invention.
Figure 5A:
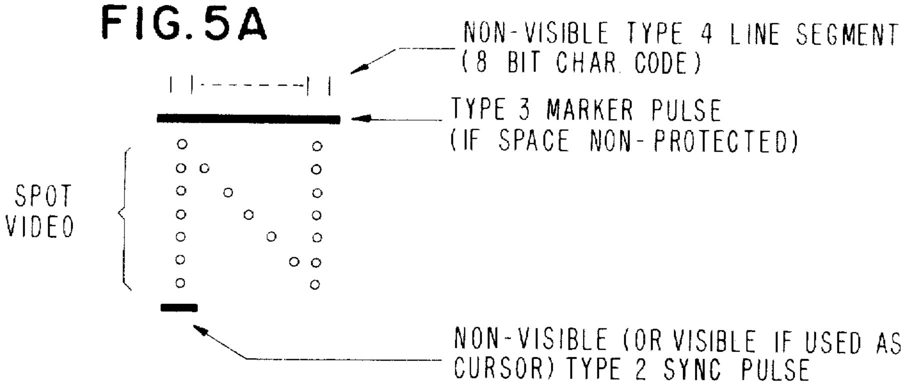

Referring to FIGS. 4, 5 and 5A, the present system is adapted to handle plural types of interlaced lines of video and control intelligence. Video lines hereinafter are also designated "type 1" lines. There are three distinct types of control lines designated "type 2," type 3 and type 4. Although only four discrete types are described, the extension to larger numbers of line types will be readily understood and implemented by those skilled in the processing arts.

Each type of line contains an associated tag code in the initial retrace segment HRT (Horizontal Retrace Time). Two bits are used to distinguish the four different line types; 00 for type 1 video, 01 for type 2 character synch information, 11 for type 3 entry-separation marker information and 10 for type 4 character code information. It will be understood that the HRT segment may include additional tag bits and other information; for instance address information providing the ability to distribute individual lines selectively to different terminals. Also the frame itself may be preceded by a tag (not shown) distinguishing between frames devoted primarily to video information and frames reserved for other information (e.g., audio).

Information stored in buffer 26 is variously composed of video, data and control lines. When the information transmitted by the host computer comprises a simple frame produced by vidicon camera 5 of FIG. 1, the stored intelligence may consist entirely of type 1 video lines. However, in spaces scheduled for entry of alphanumeric character or other textual information at the terminal, interlaced control and video lines are provided in a specific type sequence as suggested in FIGS. 5 and 5A.

Thus for terminal accessible line spaces, the buffer receives a contiguous sequence of one type 4 line, one type 3 line, *r* type 1 video lines (*r* being an integer representing the number of lines needed to trace a character in a spot raster) and a type 2 line. Type 2 and type 3 lines are not accessible to be modified by terminal circuits. Type 4 and type 1 line segments are selectively accessible for modification and output manipulation under circumstances described later. l The active (non-retrace) portions of lines in the above contiguous sequence are effectively segmented into character space segments with allowance for discrete display separation spaces between successive character tracing spaces. The type 2 line contains a single pulse in each character space segment. The type 4 line contains either blanking information or character symbol code information in each character space segment. The type 3 line contains single entry-separation marker pulses in selectively determined character space segments. The type 1 lines contain the pulses needed to trace spot video of characters or symbols represented in the corresponding space segments of the type 4 line. l The presence or absence of a marker pulse in a type 3 line character space segment serves as indication that the corresponding type 4 and type 1 character space segments are respectively accessible (unprotected) or inaccessible (protected) for modification by the terminal circuits. The buffer readout signals in the active portions of the various line types above are designated by symbols *s* with corresponding subscript numerals. Thus, stored video is represented by $s1$, stored character/symbol/blank codes by $s4$, stored marker pulses by $s3$ and stored character space synch pulses by $s2$.

Synch pulses $s2$ to have shorter durations than marker pulses $s3$; the latter spanning the respective space segments. The $s2$ readout may be utilized to provide character clock synchronization for terminal timing circuits 46 (FIG. 2) and also may be applied to the terminal display unit 54 (FIG. 2) in coincidence with delayed marker pulses of $s3$ to produce access marking cursors beneath all accessible character space segments of the displayed frame. Alternately display lines coincident with readout of $s2$ may be completely blanked. Display lines coincident with readout of $s3$ and $s4$ are completely blanked except for a single space of the $s3$ line containing the marker pulse designating the space segment next accessible for terminal modification. In this space segment a cursor may be produced indicating the next access position.

It should be understood that the character row field indicated in FIG. 5, and expanded in FIG. 5A for the letter N portion of the term "NAME," may be superimposed over a background pictorial image (a billing form, a map, a questionnaire form, etc.) the facsimile for which need not be framed by types 4, 3 and 2 lines other than in the indicated row space.

Terminal Control Logic

Figure 9:
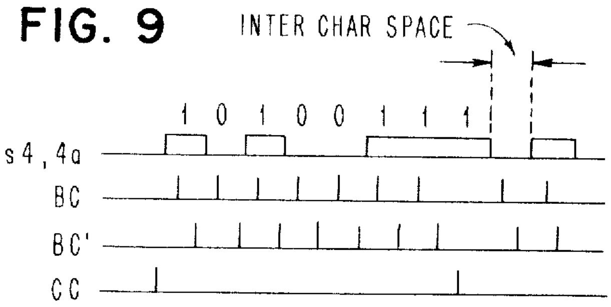
Figure 10:
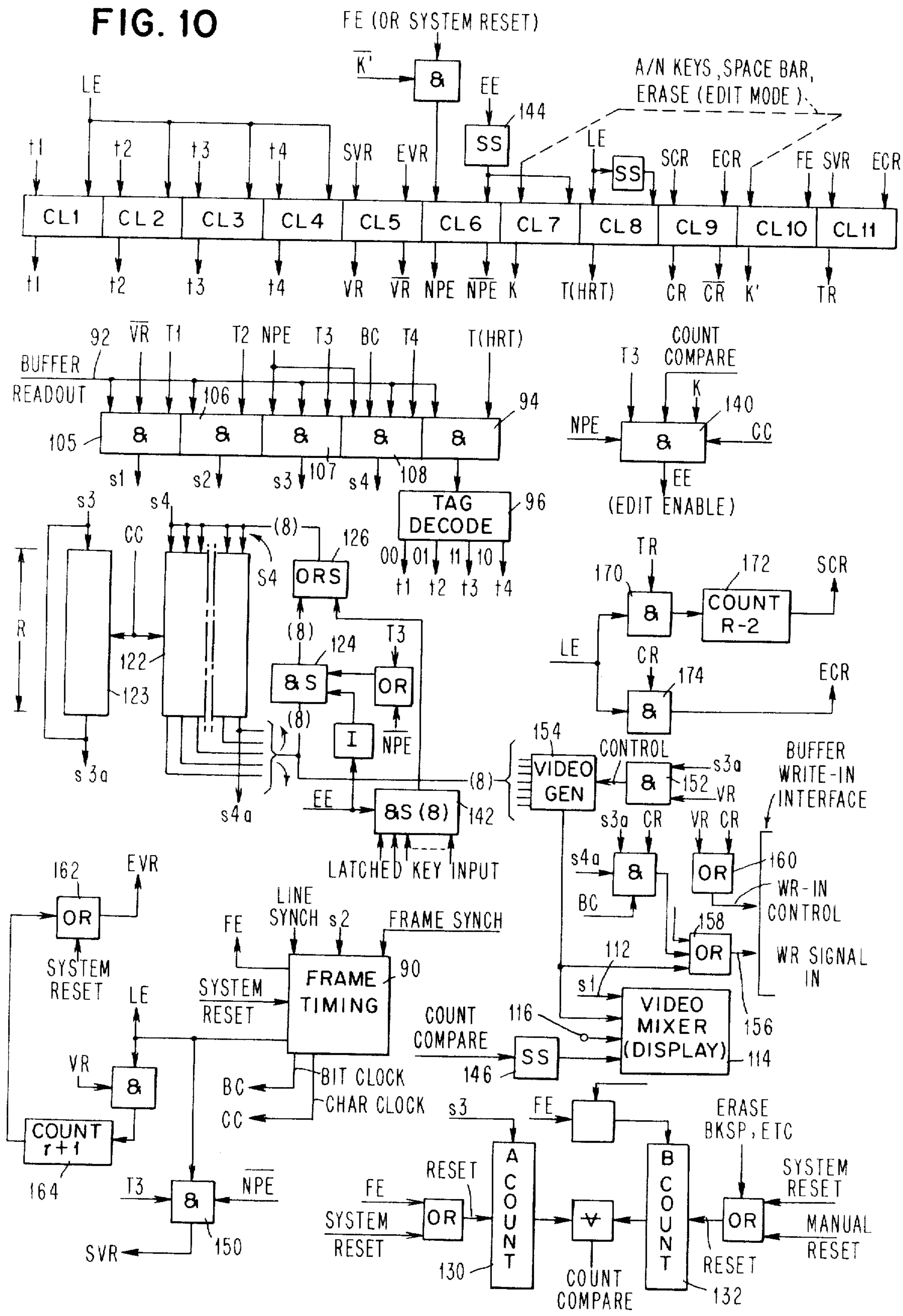
FIG. 10 is a schematic of specific terminal logic for controlling buffer loading, editing and display functions in accordance with the invention.

Waveform diagrams of FIGS. 6–9 and logic diagrams of FIGS. 10, 11, 13 and 14 illustrate terminal control and signal processing logic for handling line signals of the type discussed above. In this embodiment buffer 26 is assumed to cycle in synchronism with the display sweep so that each cycle of the buffer coincides with a complete display tracing frame. The basic buffer cycle or display sweep frame consists (FIG. 6) of $R$ ($>>r$) contiguous line intervals followed by a retrace interval. Pulses FE produced by frame timing circuits 90 (FIG. 10) at start of retrace (FIG. 6) identify the beginning of each frame. Ends of lines are distinguished by line end pulses LE (FIG. 7) produced by circuits 90 (FIG. 10). The tag signals distinguishing line types in output of buffer 26 (indicated at 92 in FIG. 10) are sampled during respective line retraces by AND circuit 94 (FIG. 10) enabled by appropriately timed pulses T(HRT) shown in FIG. 7. Output of AND circuit 94 passes to decoding circuits 96 (detailed in FIG. 14). Circuits 96 detect the tag function represented by the positive pulse pair positions straddling the negative horizontal synch pulse (see FIG. 4). The second tag bit, in coincidence with output of single shot 98 (FIG. 14) corresponding to the first tag bit extended in time, operates one of four AND circuits 99–102, according to the received tag code combination, pulsing one of four respective outputs $t1$–$t4$ with a pulse having the form indicated in FIG. 7. Video tag pulse at $t1$ sets Control Latch CL1 (FIG. 10) producing a corresponding step at T1 (FIG. 7) spanning the associated line of video spot signals $s1$ (FIG. 4). Similarly pulse at $t2$ sets control latch CL2 (FIG. 10) producing step output at T2 (FIG. 7) spanning associated line of character synch pulses $s2$ (FIG. 4). Similarly pulse at $t3$ steps output of CL3 at T3 spanning marker pulses $s3$ (FIG. 4). Finally pulse at $t4$ sets latch CL4 producing stepped output at T4 (FIG. 7) spanning character code line $s4$ (FIG. 4).

Figures 6, 7, 8, 14:
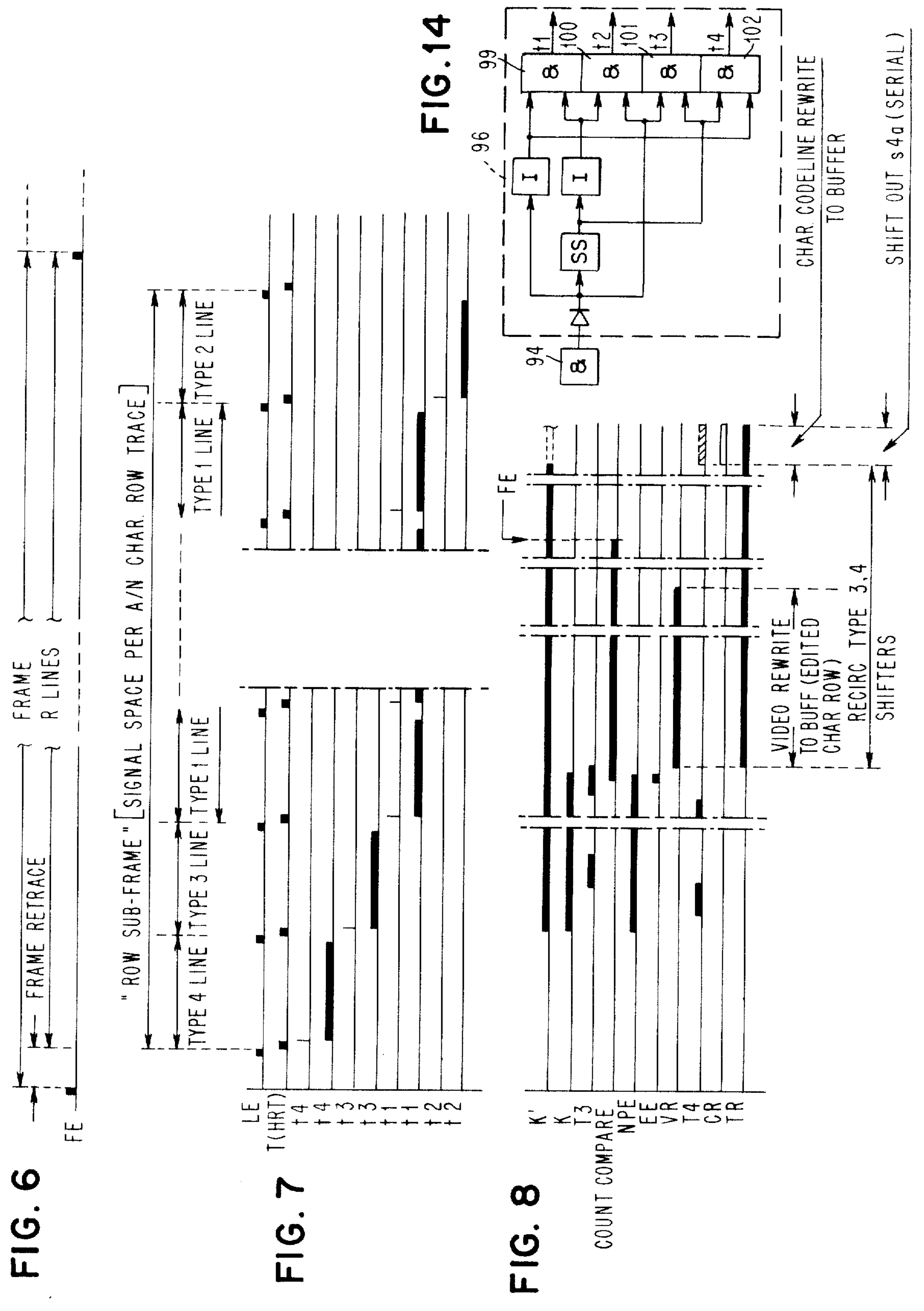
FIGS. 6–9 contain waveform-timing diagrams used to explain the operation of the subject system.
FIG. 14 is a schematic detail of decoder circuit 96 of FIG. 10.

As indicated in FIG. 7, the buffer signal readout corresponding to a character line space scheduled for terminal manipulation consists of the sequence of contiguous lines: type 4, type 3, type 1, type 1,. . . ($r$ iterations), type 2.

Control lines T1–T4 are applied to respective AND circuits 105–108 (FIG. 10) receiving the buffer readout. Thus these AND circuits pass respective signal lines $s1$–$s4$. Since latches CL1–CL4 are reset by LE step pulses at line end T1–T4 terminate at ends of respective signal lines $s1$–$s4$.

Video output $s1$ of AND 105 (FIG. 10) connects to input 112 of video mixer circuits 114 (FIG. 10) of display 54 (FIGS. 2,3). Thus, the display synchronous video output of the buffer may operate the display to trace corresponding images. Alternately the display may be operated directly by received (unbuffered) video applied at mixer input 116.

Character synch outputs $s2$ of AND 106 (FIG. 10) are supplied to timing circuits 90 (FIG. 10) and may also be applied to the display input 116 (FIG. 10) via AND 120 (FIG. 13) to trace visible cursors beneath all unprotected character spaces of the display field.

Signal lines $s4$ and $s3$ delivered successively at outputs of respective ANDS 107 and 108 (FIG. 10) are coupled to inputs of respective type 4 and type 3 recirculatable shift networks 122 and 123 (FIG. 10). Lines $s4$ contain serial character codes arranged in successive 8-bit byte groups (see FIGS. 4,9). These bits are shifted laterally to the right in network 122 to form parallel byte representations which are then shifted downwardly between character readouts to form a serial by byte parallel by bits of bytes signal representation the utility of which will be appreciated as the description proceeds. The parallel bytes passing out of the botton end of shifter 122 are recirculated via 8 AND circuits 124 and 8 respective OR circuits 126 into respective parallel inputs 54 of network 122 when ANDS 124 are appropriately enabled. Thus the information of $s4$ may be recirculated in step with the initial loading of $s3$ into shifter 123; and thereafter the information of $s4$ and $s3$ may be repeatedly recirculated coordinately in circuits 122 and 123. It should be emphasized at this point that during readout of lines $s3$ and $s4$ the display trace is blanked except for the production of a next access marking cursor as described hereafter. Shifter 122 is 8 bits wide laterally and shifters 122 and 123 are each R bits long vertically; where $R$ represents the number of textual character spaces per trace line of the display.

Key Entry of Characters

During readout of $s3$ lines A counter 130 (FIG. 10) is indexed in unit increments by the successive marker pulses on these lines and reset at the end of each frame. The progressive count in 130 thereby represents the positions of successive unprotected character spaces of the total frame. The A count in 130 is compared to the B count in cumulative counter 132 (FIG. 10) by comparator circuit 134 (FIG. 10) and an equality indication COUNT COMPARE is produced when the counts match. The B counter is indexed in unit increments, at each completion of assimilation of key entered character information into the recorded signal stream of buffer 26 (FIGS. 2, 3, 4, 5,...), and decremented by backspace and other "carriage repositioning" operations. It will be seen that the $B$ count in effect represents successive positions of a typing carriage relative to the sequential unprotected character space tracing coordinates of the display.

Operation of a character entry key or space bar is manifested by setting of control latches CL7 and CL10 (FIG. 10). Initiation of a buffer character assimilation operation is indicated by resetting of control latch CL6 which is set either upon completion of a previous operation or at system initialization (SYST RESET).

If a keyed character (or space code) has been selected and latched in not-shown staticizing latches ($K$ output of CL7 true) and if no previous entry assimilation operation is in process (NPE output of CL6 true) at COUNT COMPARE "time" AND 140 (FIG. 10) produces output EE (EDIT ENABLE). Condition EE (FIG. 8) prepares ANDS 142 and disables ANDS 124 (FIG. 10). ANDS 142 then pass the keyed information into the recirculating byte stream $S4$ of shifter 122 as a bit parallel group.

Condition EE also activates single shot 144 (FIG. 10) to reset reset CL6 ($\overline{NPE}$ true) and CL7 (K not true) disabling ANDS 140, 142 until both latches coincidentally reattain set condition (see FIG. 8). Thus entry assimilations of other keyed intelligence into the byte stream of shifter 122 is inhibited.

Condition COUNT COMPARE activates single shot 146 (FIG. 10) thereby feeding cursor energization to video intensity controls 114 causing a cursor to be displayed at the instant trace position. This coincides with readout, within interval T3 of the specific $s3$ pulse from buffer 126 which coincides in positional sequence with the instant typing carriage position of the terminal relative to the ordered set of all unprotected character spaces; i.e., the set mapped by the successive stored $s3$ marker pulses.

At end of T3 line, with CL6 reset ($\overline{NPE}$ true) as above, AND 150 (FIG. 10) is activated producing pulses SVR (START VIDEO REWRITE) serving as setting input to latches CL5 (FIG. 10) and CL11. With CL5 set, line VR (Video Rewrite) assumes true condition activiating AND 152 and Video Generator unit 154 to translate recirculating bit-parallel output bytes of shifter 122 into corresponding serial signals to control spot video intensity. These form an $s1$ type line applicable to the display and to signal recording input 156 of buffer 26 via OR 158. At the same time buffer 26 is operated in write mode to record at input 156 by translation of condition VR, via OR 160, to WR IN control of the buffer.

This continues until VR terminates by resetting of CL5 with EVR (End Video Rewrite) received via OR 162 from counter 164. Counter 164 is indexed by LE pulses during VR and "overflows" to reset condition after $r+1$ increments (corresponding, as expected, to the interval required to trace a character row of $s1$ video). Thus buffer 26 is loaded with edited video corresponding to the edited code content of shifter 122. AND 152 may be enabled either by recirculating marker pulse outputs $s3a$ of shifter 123 as shown (thereby recording video only in unprotected spaces) or VR may be applied directly to control video generator 154.

Video generator 154 is preferably a read only or read/write matrix store receiving combined bits of bytes of shifter 122 and output of counter 164 as address inputs and providing output corresponding to the associated video for tracing the $r+1$ line segments of the display image representation corresponding to each shifter byte in the appropriate time relationship.

Shifters 122 and 123 continue to recirculate thru the end of the present frame and into the next frame, retaining the code of the edited $s4$ line and the markers of the corresponding $s3$ line, until latch CL11 is reset (TR reset to "untrue"). In the interim TR conditions AND 170 to pass line end pulses LE as incrementing pulse inputs to counter 172. Overflow of counter 172 coincides with cycling of buffer 126 relative to the type 4 code line corresponding to the edited line in shifter 122. Overflow of counter 172 produces SCR (START CHAR REWRITE) setting latch CL9 (CR true).

Figure 11:
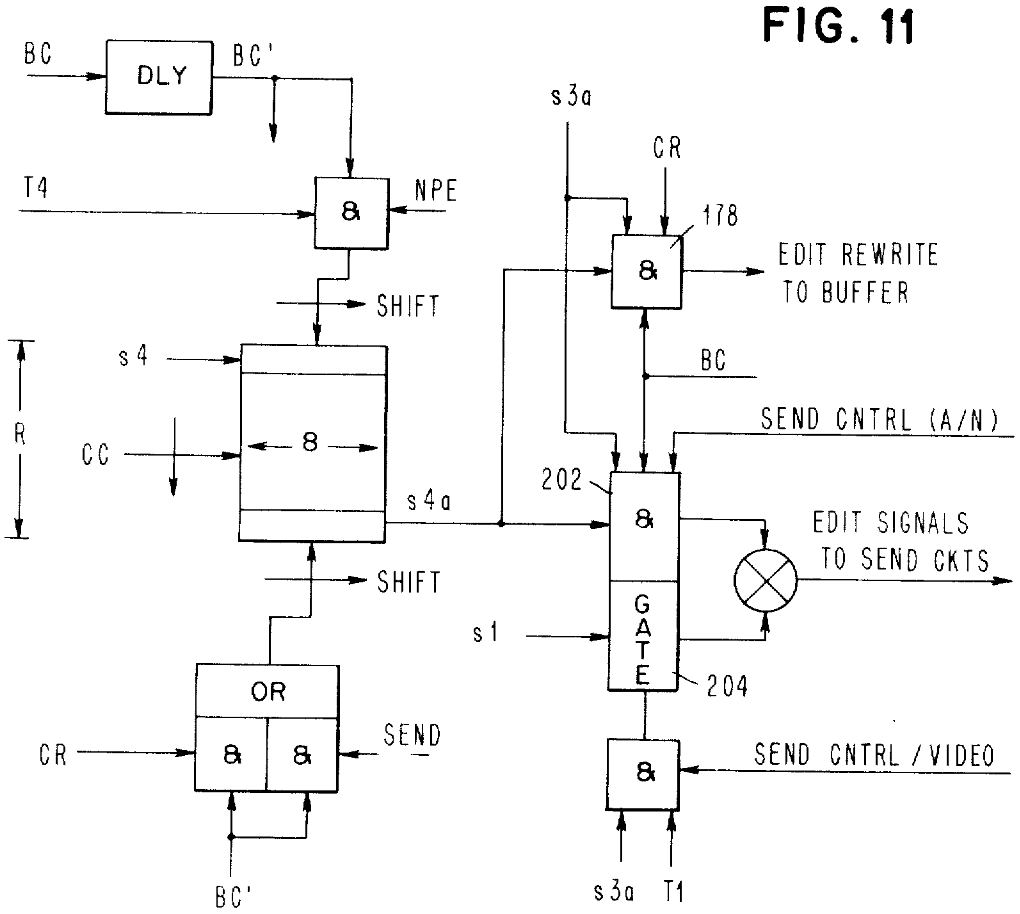
FIG. 11 schematically illustrates specific features of the recirculating type 4 line shift network of FIG. 10 and associated logic for controlling input and transmission editing functions of the terminal.

With CR true AND 174 is enabled for one line subframe passing the next LE pulse as ECR (END CHAR REWRITE) as resetting input to CL9 and CL11. In the interim, WR IN control of buffer 126 is enabled by CR via OR 160 and signal $s4a$ (serial output of shifter 122) is written into buffer 126 via AND 178 completing the rewriting of the edited line. Signal $s4a$ is produced (FIG. 11) by right-shifting the bit-parallel output bytes eight times between character (vertical) shifts, in synchronism with delayed bit clock timing function BC' (FIGS. 9–11). In operation then shifters 122 and 123 normally receive and circulate successive $s4$ and $s3$ line outputs of buffer 126 until COUNT COMPARE, K and NPE (NO PRIOR EDIT - THIS FRAME) coincide producing EE (EDIT ENABLE). Since *K* indicates a latched but unentered key selection and COUNT COMPARE is produced by a last-counted $s3$ marker pulse designating an immediately accessible character space in the six stream shifter 122, the latched key information is immediately assimilated into the circulating $S4$.

In contiguous video line intervals immediately following the $S3$ line readout buffer 26 is operated in write mode receiving *r* type 1 edited video lines, these correspond to the edited code line stream in shifter 122 and are provuced by video generator 154.

Shifter 122 then continues to hold the edited code until buffer 26 arrives at corresponding line position from which the edited $S4$ line was originally fetched. The edited line is then recorded in buffer 26 completing the editing-assimilation operation.

Referring back to FIGS. 5 and 5A in reference to the tracing of the character N, it will be clear that in the first recirculation interval of shifter 122, following insertion of a new character code, outputs of the video generator corresponding to the tracing of the character N would consist of the upper two dots forming the first horizontal line of the character N, then in the next line the three dots associated with the N and so forth; a similar process occurring for all other character code and blank code tracing functions.

The reason for rewriting entire edited lines rather than edited character segments of lines may be understood as follows. In the preferred embodiment, the buffer 26 is a compliant magnetic disc preferably of the type disclosed in U. S. Pat. application Ser. No. 11,498, filed Feb. 16, 1970 in behalf of G. Lawrence, H. J. Mueller and entitled "High Frequency Flexible Medium Recording Method" and now U.S. Pat. No. 3,733,016. The transients involved in switching the rewrite head of the buffer between reading and writing modes represent noise which can mutate recorded information if the switching occurs while the record head intercepts information. Accordingly, it is desirable to switch between reading and writing modes only at discrete line end positions intermediate the last recorded information element of one line and the first tag code bit of the succeeding line. An obvious advantage of utilizing such a disc buffer is that both analog and digital information may be efficiently recorded thereby providing displays and hard copy print (e.g., at 70, FIG. 1) of high tone quality. Obviously if an all digital solid state buffer system is utilized much of the foregoing video and code line assimilation process may be reduced to video and code character segment assimilation and the modification of the controls required to do so should be immediately apparent to one skilled in the art.

Separation of Terminal Originated Information From the Buffer

Referring to FIG. 11, terminal originated information may be extracted from the buffer and segregated for further process handling or delivery to the host computer as follows. In separation mode the buffer readout of type 4 textual character code lines and type 3 entry-separation marker lines into respective shifters 122 and 123 proceeds as explained previously. As each parallel by bit type 4 byte reaches the last stage of shifter 122 the bits of the byte are right-shifted serially to $s4a$. Under control of markers $s3$ AND circuit 202 transfers unprotected bytes to terminal send circuits (of other processing/handling circuits) and thence in compact form to the host computer which, having a record of the type 3 mapping of the terminal buffer can reconstruct the composite buffer record. As indicated in FIG. 11, if desired an additional gate 204 may be operated by the recirculating marker signals $s3a$, T1 and a Video Send control function to transfer video signals from path $s1$ of FIG. 10 to the send circuits linking the host computer. This would be useful for instance to permit terminal generated edited video corresponding to edited type 4 codes to be sent directly to the host computer permitting the host computer to recreate the image displayed at the terminal without repeating the video generation operation on the edited code information. Thus, the processing efficiency of the system would be enhanced.

The form of the signals applied to the sending circuit and the time relations of bit clock signals BC and character clock signals CC is indicated in FIG. 9.

Figure 13:
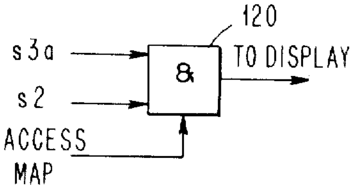
FIG. 13 is a schematic of logic for producing display cursors indicating all accessible spaces of the display frame to a terminal operator.

FIG. 13 illustrates an additional cursor display function which can be useful in many instances. AND 120 when enabled by coincidence of control function labelled "ACCESS MAP," recirculating marker $s3a$ and buffer character synch readout $s2$ (i.e., during $T2$) activates the video input of the terminal display unit to produce a cursor indication beneath the associated character space (reference FIG. 5A, type 2 line pulse beneath the letter N). Since this is repeated at each position for which a type 3 entry-separation pulse is recorded, it may be seen that the resultant cursor interlineations will effectively map or indicate all accessible character spaces available to the terminal operator for manipulation.

Example of Conversational Process

An example of a conversational process using the facility heretofore described is as follows. Assume that the terminal is engaged in a computer assisted instruction process in which a student operating a keyboard at a terminal views a composite display of computer generated information and is prompted to react to the same by operating the terminal keys in a prescribed manner. Assume further that the computer generated information comprises a picture and a printed question requiring the student to select a character from a multiple choice list of characters.

The access cursor described above indicates the next accessible space (reference COUNT COMPARE output of single shot 146 FIG. 10) which to the student represents the appropriate and only space for entering his selection choice. When the student then selects the appropriate key, the corresponding code and video functions representing his selection are assimilated into the buffer 26 as explained previously (at $A$ count $= B$ count $= 1$). If the student then operates another key indicating that his selection operation in respect to the present display information is complete (e.g. an "Enter key") send circuits linking the terminal to the host computer are activated, the information in the buffer is scanned selectively and the edited insertion information corresponding to the multiple choice answer selection is separated from the other information of the buffer and transmitted to the host computer. This information may be either the simple textual character code representing the selection choice or it may include as well the video pattern by which the corresponding character symbol indication is traced.

Figure 12:
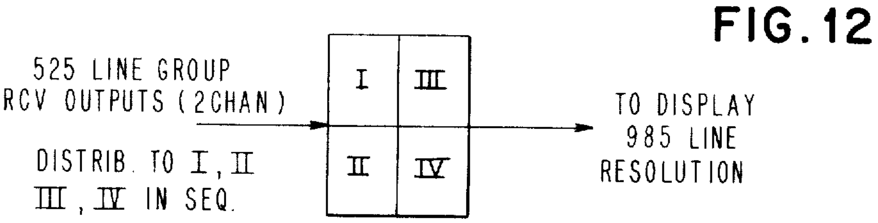
FIG. 12 is a schematic utilized to explain another feature of the invention.

If display resolution is insufficient for particular applications due to bandwidth limitations of the communication channel, the presence of the interlaced control lines, or other factor, a plural-section buffer may be used as indicated in FIG. 12 to accumulate video and control display information in quarter-page sections each 525 lines while applying the output of the buffer to the display as an integral unit and operating the display at 985 sweep lines per visible portion of frame. In this arrangement the control and character code information may either be interlaced or included in inactive segments of respective lines.

Various other arrangements readily occur. For instance, the terminal upon completing its transmission to the host through the sending arrangement of FIG. 11 may retain the composite information in buffer 26 and the host may communicate further and transmit a system reset command to the terminal to reposition the $B$ counter of FIG. 10 to an initial condition permitting the terminal operator to interact with the previously displayed information a second time. Alternately the host may clear the unprotected spaces of buffer 26 providing an appropriate command condition which would induce the terminal to simulate a constantly operated space bar (i.e., to provide setting conditions for latches CL7 and CL10 of FIG. 10) terminating upon a predetermined $B$ count.

The foregoing commands to effect supplemental terminal operations may be included in protected spaces of type 4 control lines which need not associate with video information of subsequent type 1 lines.

While the invention has been particularly shown and described with reference to a preferred embodiment thereof, it will be understood by those skilled in the art that various changes in form and detail may be made therein without departing from the spirit and scope of the invention.

What is claimed is:

1. In an information processing network including first and second stations linked for communication in combination:

means in said first station for transmitting composed multiplex signal messages to said second station; individual messages being subject to including a line scan representation of graphic (i.e., non-coded) information interlaced with discrete lines of control information and coded data; particular said control lines including discrete access marker signals individually associated with discrete segments of a particular group of other said lines of the same message;

means in said second station for receiving said transmitted messages;

means in said second station for extracting representations of said marker signals from said message for delayed presentation in association with said particular group of other lines of the same message; and means in said second station responsive to said delayed marker signal representations presented by said extracting means for selectively processing associated signal portions of said other lines.

2. The combination of claim 1 wherein said means for selectively processing includes means for forming a compact reply message out of the said processed signal portions and means for transmitting said reply message to said first station subject to format association at said first station with said same message originally transmitted to said second station.

3. The combination of claim 1 wherein said means for selectively processing includes means for keying-in data and means for entering representations of successive said keyed-in data into successive said associated signal portions of said message marked by said delayed marker signal representations.

4. In a conversational information processing system in combination:

dominant and subordinate information processing stations linked for full duplex communication;

the dominant station organized to supply messages of predetermined format to the subordinate station in time multiplex message frames of predetermined duration each frame corresponding to a video display raster scan; said messages being subject ot including lines of discrete access marker signals having selective timing associated with the raster positions of corresponding discrete segments of predetermined groups of other lines of the same message and distinguishing said associated segments thereby as accessible for modification and/or selective process handling in said subordinate station;

said subordinate station including:

means for receiving said messages; means for extracting marker signals from the received message for delayed presentation in coincidence with said associated segments;

a source of locally originated information signals; first means conditionally responsive to said delayed marker signals to insert representations of said locally originated signals into said associated segments of the received message; and second means conditionally responsive to said marker signals to separate said locally originated representations from said associated segments in order to effect further processing of said representations, such as associated with said received message.

5. In a picture-oriented duplex communication system for handling various forms of information besides picture (e.g., voice, digital data, etc.) in combination:

a dominant transceiving station providing composite message transmissions in time multiplex intervals synchronous with line and frame intervals of a predetermined flying spot raster sweep; said signals including interlaced lines of entry-separation marker signals, video signals and data signals; said lines including inactive (retrace) and active segments; said marker signal and data signal lines distinguished by distinctly coded identification tag signals located in respective inactive segments; said marker signal lines each including at least one selectively timed marker pulse; and a subordinate transceiving station linked with said dominant station in a full duplex conversational processing network; said subordinate station including: means for selectively receiving and storing representations of individual said messages transmitted by said dominant station; first means responsive to the tag and marker signals of said stored message for inserting representations of data signals originated at said subordinate station into said storing means at storage spaces designated uniquely by the positions of said marker signals in said message; and second means responsive to said stored tag and marker signals for locating said inserted data signal representations for composing compact reply messages for transmission to said dominant station.

6. In a display terminal having an information processing unit and a display unit operated by a raster scanned selectively illuminated spot, the improvement comprising:

means providing discrete selectively timed entry-separation marker signals coinciding in time with the tracing of selected viewing areas of said display unit and protected against modification by said terminal; the presence and absence of discrete marker signals at particular trace time segments effectively designating corresponding trace segments of other lines as accessible and inaccessible in respect to alteration of intelligence presented in said corresponding segments by said processing unit; and means selectively responsive to said marker signals for enabling transfers of information from said processing means to occur exclusively during said corresponding accessible segments.

7. A display terminal in accordance with claim 6 including:

means responsive to said marker signals for producing next access cursor indications exclusively in viewing areas associated with said accessible trace segments.

8. A display terminal according to claim 7 including:

means responsive to successive entry transfer operations of said processing means to operate said crusor producing means to index the position of said next access cursor indication to successive viewing areas associated with groups of successive said accessible trace segments.

9. A data processing terminal for handling intermixed picture intelligence, data and control intelligence comprising:

a cyclic buffer store having capacity to store composite picture intelligence representing a page of displayable information including at an arbitrary position therein a group of associated contiguous lines of picture information, non-displayable data code signals and entry-separation marker signals, said associated groups of lines being distinguishable from each other by distinct tag signals preceding each line;

input means for originating picture and data signal representations; and means responsive to tag and marker signals received from said store for inserting representations of the signals originated by said input means into segments of the storage space occupied by the picture and data signals associated with said marker signals; said segments having positional association with individual said marker signals.

10. A terminal according to claim 9 wherein said means for inserting includes:

first (A) and second (B) counters; said B counter being cumulatively incremented after individual insertion operations of said inserting means; said A counter being incremented in response to successive said marker signals during each cycle of operation of said buffer store and reset to a predetermined reference count condition between cycles;

comparison means coupled to said counters for partially conditioning operation of said inserting means at occurrences of matching conditions (count compare) of said counters.

11. Terminal according to claim 10 wherein said inserting means includes:

sources of control signals (K,NPE) indicating present availability of signals to be inserted in said store and non-occurrence of previous insertion operation during the present cycle of said store; and means responsive to coincidence of said control signals (K,NPE) and said count compare signal to provide an entry enabling signal (EE) permitting insertion of said available signals into a coincident position of said store.

12. Terminal according to claim 10 including:

a raster display unit coupled to said store and directly responsive to readout of the said picture information to produce a corresponding cyclically refreshed picture display; and means coupled between said comparison means and said display unit for producing a cursor on said display indicating next accessible viewing and storage areas in response to occurrences of said count compare condition.

13. Terminal according to claim 11 including:

a source of clocking signals for tracking readout of said associated line group;

a shift register for recirculating individual said marker signal lines in correspondence with said associated line group in response to said clocking signals; and means responsive to said clocking signals and said marker signals in said shift register to produce viewable cursors on said display adjacent all viewing spaces mapped as accessible to modification by said marker signals.

14. In a display terminal having a display unit operated by a raster swept trace and having a serial cyclic buffer store adaptive to retain signal representations of video spot intensity in either analog or digital form and to present the same to said unit repeatedly for display in synchronism with the sweep trace thereof, the improvement of:

means for entering externally originated edit control lines into said store at time positions interlaced between lines of said stored video representations and distinguishable therefrom by coded tag signals coinciding in time positioning with the retrace (dead time) tracing segments of corresponding sweep lines of the display unit;

means for selectively blanking said display unit during active sweep tracing intervals coinciding with readout of said edit control lines;

means responsive to readout of a selected edit control line from said store to produce a viewable next-access marking display cursor at a discrete trace position trace of the display unit associated with a particular marker signal in said selected line;

shift means for storing said selected edit control line for use subsequent to said readout;

means responsive to the recirculated edit control lines provided by said shift means for controlling insertion of new information signals into corresponding storage spaces of said buffer store marked said particular marker signal and later for controlling separation of said inserted signals for segregated process handling apart from other signals stored in said buffer store; and means for operating said cursor producing means to select a successive particular marker signal in order to index the position of said cursor following each said insertion or separation operation.

15. In a display terminal having an information input unit and a display unit scanned by a raster spot trace in combination:

a source of entry-separation control marking signals each having selective timing corresponding to passage of said spot trace across a respective viewing area portion of said display, said source being capable of selectively providing or withholding a marking signal in each raster frame each of a plurality of timing intervals corresponding to a plurality of said viewing area portions, and thereby capable of arbitrarily mapping said viewing area portions into accessible and inaccessible sets;

first logical gating means responsive to a selected one of the marker signals provided by said source in each frame for operating said display unit iteratively to produce a visible cursor in a respective selected one of said viewing area portions;

second logical gating means responsive to said selected marker signal to enable transfer of information from said input unit into the video input signal stream of said display in synchronism with the tracing of said selected viewing area; and third logical gating means operating in coordination with the transfer of said information representation by said second gating means to condition said first gating means to index said cursor to another viewing area position associated with another different one of said marker signals when other said marker signals are provided by said source in the same frame.

16. In a duplex video communication system:

a source of raster video line signals interlaced with selectively positioned lines of selectively timed entry-separation marker signals mapping discrete character area portions of the raster space into distinct accessible and inaccessible sets; said marker lines distinguished by a distinct edit tag signal in the initial libe segment coinciding with an inactive (retrace) segment of the raster;

a plurality of terminals linked to said source and designatable selectively as recipients of said signals by address intelligence preceding said signals;

each terminal including:

a serial buffer store synchronized with said source and having capacity to record a complete video-marker frame; said store comprising a compliant disc having a record/ reproduce head subject to switching between read and write modes of operation only during storage cycle intervals between active line segments (i.e. only during line and frame retrace);

a flying spot raster display unit synchronized with readout of said buffer store for displaying the video portion of the store readout;

input means for originating character text signals subject to assimilation in the stored frame; and means responsive to marker signals in the store readout for effecting transfer of signals from said input means to select character spaces in said store marked as accessible by respective said marker signals.

17. A method of carrying out conversational video communication processes comprising:

distributing framed display-synchronous video in composite with entry-separation marker information from a host computer retaining a record copy of the information to plural subordinate terminals; said marker information providing a select mapping of the video frame into discrete unprotected (accessible) and protected (inaccessible) subintervals;

arranging for said terminals to selectively receive and synchronously record the distributed information frame and to synchronously display the video portion of the recorded information;

arranging further for said terminals to originate intelligence signals and to record representations thereof compositely meshed in the recorded frame only in said unprotected intervals by means of references to said marker signals; and arranging for said terminals to separate said recorded terminal originated representations for processing and segregated transmission to said host by means of reference to said marker signals; enabling the host computer to reconstruct the composite information of the terminal record from said retained copy.

* * * * *